United States Patent [19]

Fichter

[11] 4,323,933

[45] Apr. 6, 1982

[54] DEVICE FOR ERASING A RECORD CARRIER RECORDED BY MAGNETIC FIELDS IN VISUALLY READABLE FORM

[75] Inventor: Manfred Fichter, Königsfeld, Fed. Rep. of Germany

[73] Assignee: Kienzle Apparate GmbH, Villingen, Fed. Rep. of Germany

[21] Appl. No.: 89,257

[22] Filed: Oct. 29, 1979

[30] Foreign Application Priority Data

Nov. 3, 1978 [DE] Fed. Rep. of Germany ....... 2847682

[51] Int. Cl.$^{3}$ .......... G11B 5/02

[52] U.S. Cl. .......... 346/74.3; 346/74.5

[58] Field of Search .......... 360/56, 57, 5; 346/74.1

[56] References Cited

U.S. PATENT DOCUMENTS 2,838,360 6/1958 Foster .......... 346/74.1

4,054,922 10/1977 Fichter .......... 360/56

FOREIGN PATENT DOCUMENTS 2530092 1/1976 Fed. Rep. of Germany .

*Primary Examiner*—Glen R. Swann, III

*Attorney, Agent, or Firm*—Toren, McGeady & Stanger

[57] ABSTRACT

The record carrier allows visually readable recordings of measured values. A measuring device associated with said record carrier is driven by a drive device. The erasing device comprises at least one erasing magnet positioned directly on top of the record carrier and movable transverse to its transport direction so that the magnetic axis is parallel to the plane of the record carrier. The movement of the erasing magnet is effective essentially in the direction of the magnetic axis. A permanent magnet is used as the erasing magnet. A carrier for the magnet is in driving connection with the driving device of the measuring device.

4 Claims, 4 Drawing Figures

DEVICE FOR ERASING A RECORD CARRIER RECORDED BY MAGNETIC FIELDS IN VISUALLY READABLE FORM

FIELD OF THE INVENTION

The invention relates to a device for erasing a record carrier which is recorded by the use of magnetic fields in visually readable form. The erasure is effected by at least one erasing magnet to be moved across the record carrier transverse to its transport direction.

BACKGROUND OF THE INVENTION

It shall be assumed that when such a record carrier is used, all of the recording procedures as well as the structural and operative features of the record carrier material are sufficiently known. As may also be seen from DE-OS No. 25 20 581 (which corresponds to U.S. Pat. No. 4,054,922), there is also a problem that when such a record carrier is to be used, the dark recording line thereon, "light", is to be erased so that subsequently a dark recording line may be recorded on a light recording surface. Also, the specific extent of application of such recording process and similar recording processes is known. It comprises recording methods in which only the development of one value to be measured immediately before a certain happening is of interest, while older recordings are erased. This restriction allows the recordings to be stretched out so that there is a greater large scale recording of the measured quantity and so that a continuous use of new recording material is avoided.

A typical example of such a recording procedure is the recording of accident data, especially the recording of the speed of a vehicle over the distance last covered by the vehicle.

It is to be understood that a recording device suited for this recording procedure is subjected to very rough operating conditions and must therefore be designed correspondingly. This refers to the sensibility to outside magnetic fields, to shocks, as well as to temperature conditions. The special field of application of this device, due to its wide spread use, requires it to be absolutely reliable in functioning over a long period of time without any servicing. Also, it should be ready to function without any auxiliary forces and it should also be possible to install it in the vehicle without any special knowledge. This means that it must be easy to handle and that it should be independent of its place of installation in the vehicle. On the other hand, for such a device, the conditions of mass production have to be taken into consideration, which means the provision of a construction which is easy to mount, has a small number of parts and uses simple parts.

If, for a recording device of such kind, a record carrier of the above described kind is provided in a manner in which a "light" erasure of the recordings is desired, the means previously used for such erasure of the recordings cannot fulfill the above-mentioned conditions. According to prior suggestion, an optimal effect in erasing is only achieved when two magnetic fields, especially two magnetic alternating fields, become effective in the plane of the record carrier. The effective direction of the magnetic fields shall cross each other in the direction of the transport movement of such record carrier, which means that in each range of the record carrier to be erased, the fields shall be effective essentially at right angles to each other. Correspondingly designed erasure devices have relatively expensive electromagnets which are preferably magnetized by alternating current. The size of such erasure, resulting from the fact that they must grip the record carrier from its two sides, thereby makes them unsuited for this special field of application.

A generally satisfactory erasure may, for instance, also be achieved when a record carrier is moved in the field of an individual electromagnet in such manner that the range of the record carrier just leaving the effective range of the electromagnet is exclusively penetrated by field lines which are in the plane of the record carrier or which are only slightly inclined thereto. With this knowledge, as may be seen from DE-OS 25 30 092, it is possible to make erasing devices with an electromagnet which is much smaller and which may be moved transverse to the transport direction of the record carrier, the magnetic axis thereof being in a plane parallel to the record carrier and the movement of the electromagnet being essentially in the direction of the magnetic axis.

Such erasing devices with one or several movable electromagnets have certain advantages as compared with the already mentioned statically arranged erasing devices, particularly with respect to space and energy requirements. However, they require rather expensive driving means and suitable electrical connections in the form of sliding contacts which, as is well-known, are subject to wear and must be serviced. For the required purpose, which means for a recording device to be installed in a motor vehicle, the erasing devices as described in the above-mentioned DE-OS No. 25 30 092 are very unsuitable, especially since they function only when the necessary current supply is available.

SUMMARY OF THE INVENTION

It is therefore an object of the present invention to provide an erasing device for a record carrier to be modified by magnetic fields which avoids the apparent disadvantages of known erasing devices. It is a special object of the invention to provide an erasing device which requires little expense to produce and to mount and having its reliability adapted to the conditions of a recording device for mass production and for installation in a motor vehicle.

To meet the objects of the invention, a permanent magnet is used as an erasing device with the carrier of the erasing magnet being in driving connection with the driving means delivering the measured value.

In an advantageous embodiment of the invention, the carrier for the erasing device is subjected to an oscillating movement.

In another embodiment, a rotatably mounted disc-shaped magnet is used which is made of permanent magnetic material at the circumference of which there is at least one pair of magnetic poles, the magnetic body being in driving connection with the driving means for the record carrier.

For a better understanding of the present invention, reference is made to the following description and accompanying drawings, while the scope of the present invention will be pointed out in the appended claims.

DESCRIPTION OF THE PREFERRED EMBODIMENTS

Figure 1:
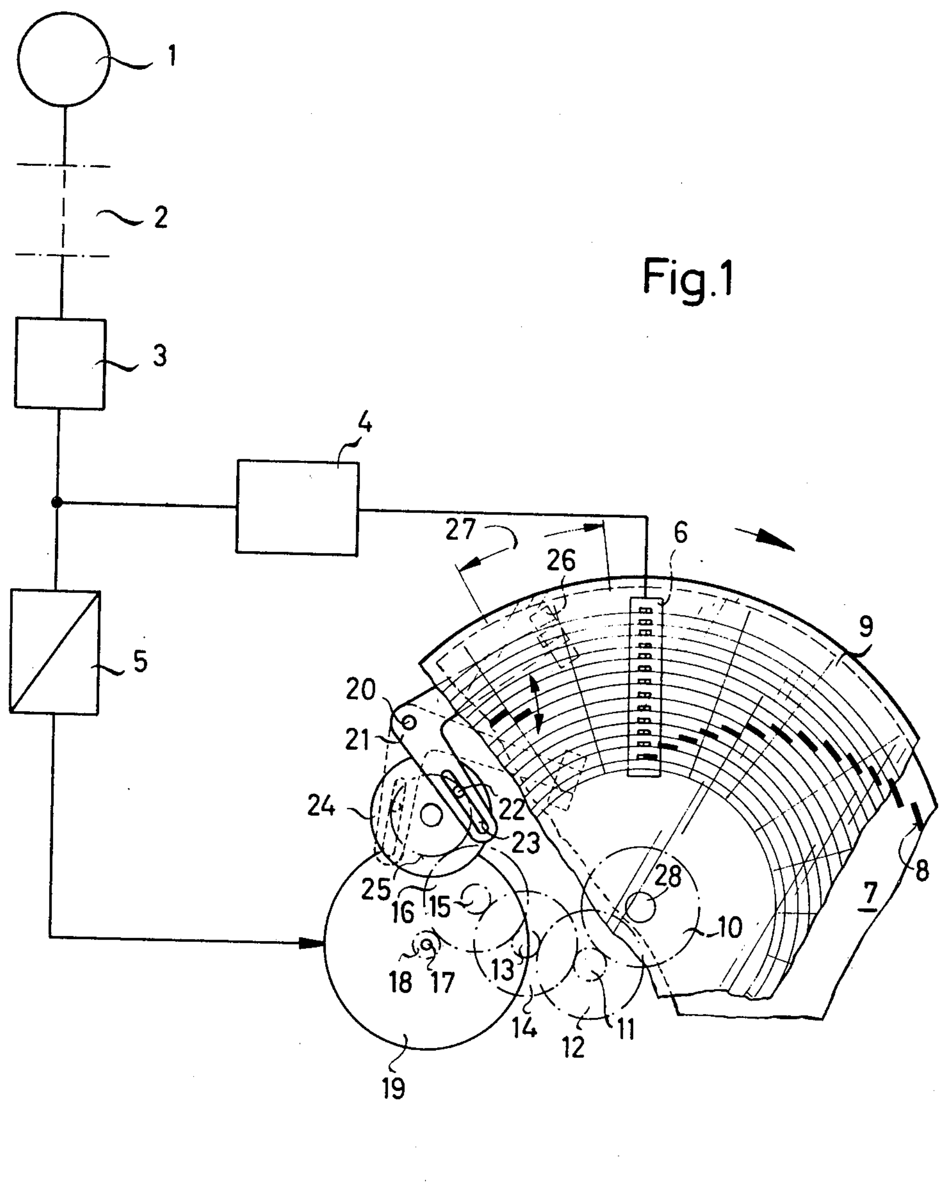
FIG. 1 illustrates in partially schematic form a broken away view of a recording device in accordance with the present invention.

The principal representation—FIG. 1—shows a recording device for recording the speeds driven by a vehicle over a certain final distance covered thereby in which the erasing device according to the invention is used so that the recordings on the record carrier of the above-mentioned kind are continuously erased.

In this recording arrangement, the measured values are treated electronically. A pulse generator 1 via a lead 2 delivers distance proportional pulses to an internal pulse shaper 3, the output pulses of which appear at the input of a speed measuring circuit 4 and also at the input of a pulse reduction device 5, the functions of which, in this connection, are not essential for the invention and therefore are not explained in any detail.

The speed measuring circuit 4 is connected to a comb-shaped recording device 6 with a plurality of recording elements bearing no specific reference numerals. They receive electrical current in dependence upon the signals delivered by the speed measuring circuit 4 and record diagram elements, one of which has been marked by 8, on the record carrier 7 which, in the example shown, is driven in dependence upon the distance covered in the direction of the arrow. Associated with the record carrier 7 is a scale disc 9 as a carrier or support, to which the record carrier 7 is fastened in suitable manner (not shown).

The carrier 9 is rotatably mounted on an axis 28 and is driven by means of a gearing 10, 11, 12, 13, 14, 15 and 16 and a small gear 18 mounted on the motor shaft 17 of a step motor 19 which rotates in dependence on distance. The step motor 19 is controlled by suitable pulses delivered by the reduction circuit 5. Simultaneously, an angle lever 21 mounted on a shaft 20 via a pin and slot connection 22/23, a disc 24 and a toothed wheel 25 firmly connected thereto is in engagement with the toothed wheel 16 to be subjected to an oscillatory motion so that a bar magnet 26 fastened to one shank of the angle lever 21 is oscillated over the record carrier 7 transverse to its transport direction so that the recordings on the record carrier 7 are erased in a certain sector 27. As has already been described above, the stray field of the bar magnet 26 is effective essentially in the plane of the record carrier 7.

Instead of a comb-shaped recording device 6, a recording means in the form of a slide or a swinging lever to be set by a setting motor may be used as provided for in DE-OS No. 25 20 581.

Figure 2:
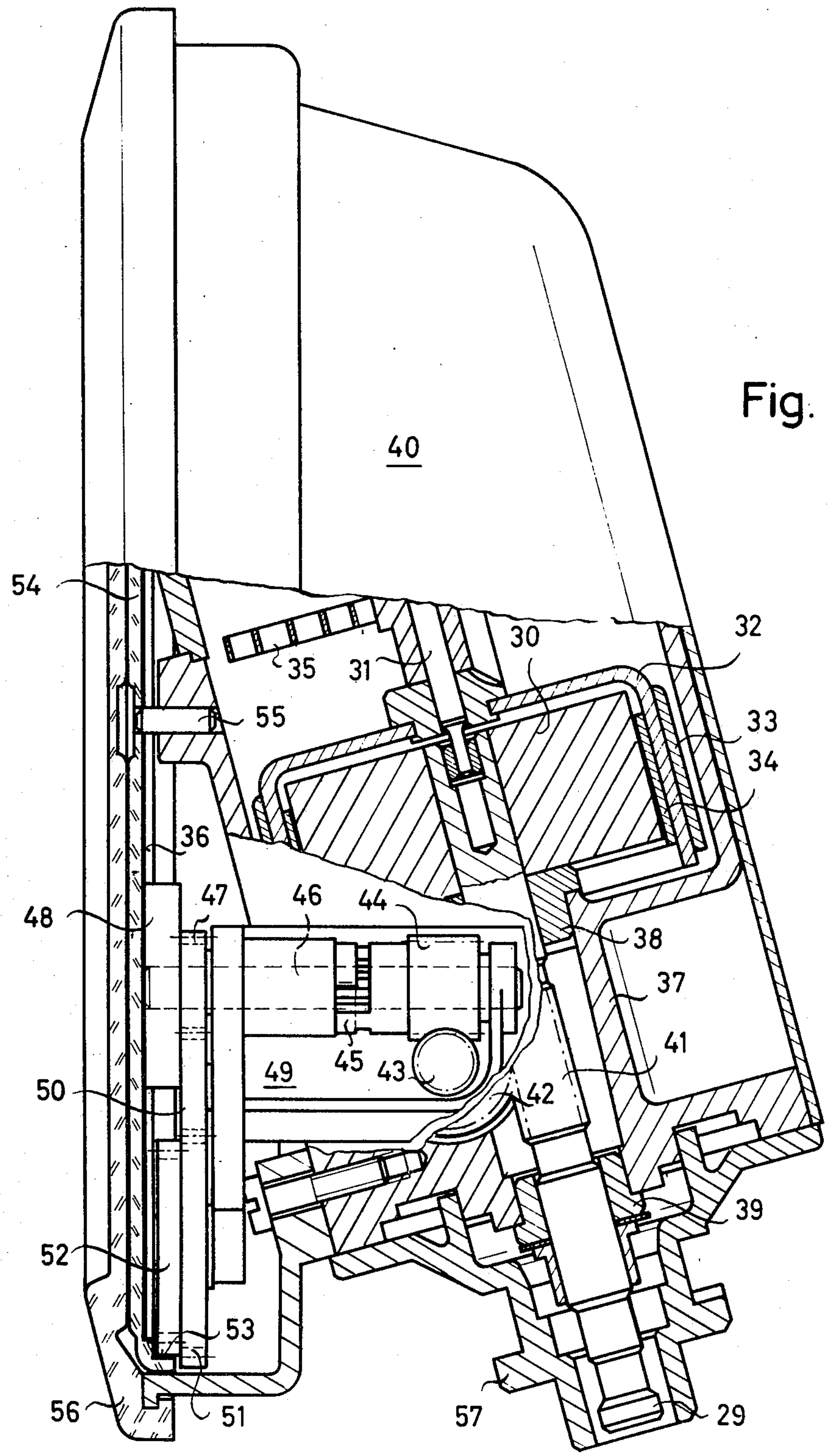
FIG. 2 represents a partially cross-sectional view of the speed measuring device of the invention.
Figure 3:
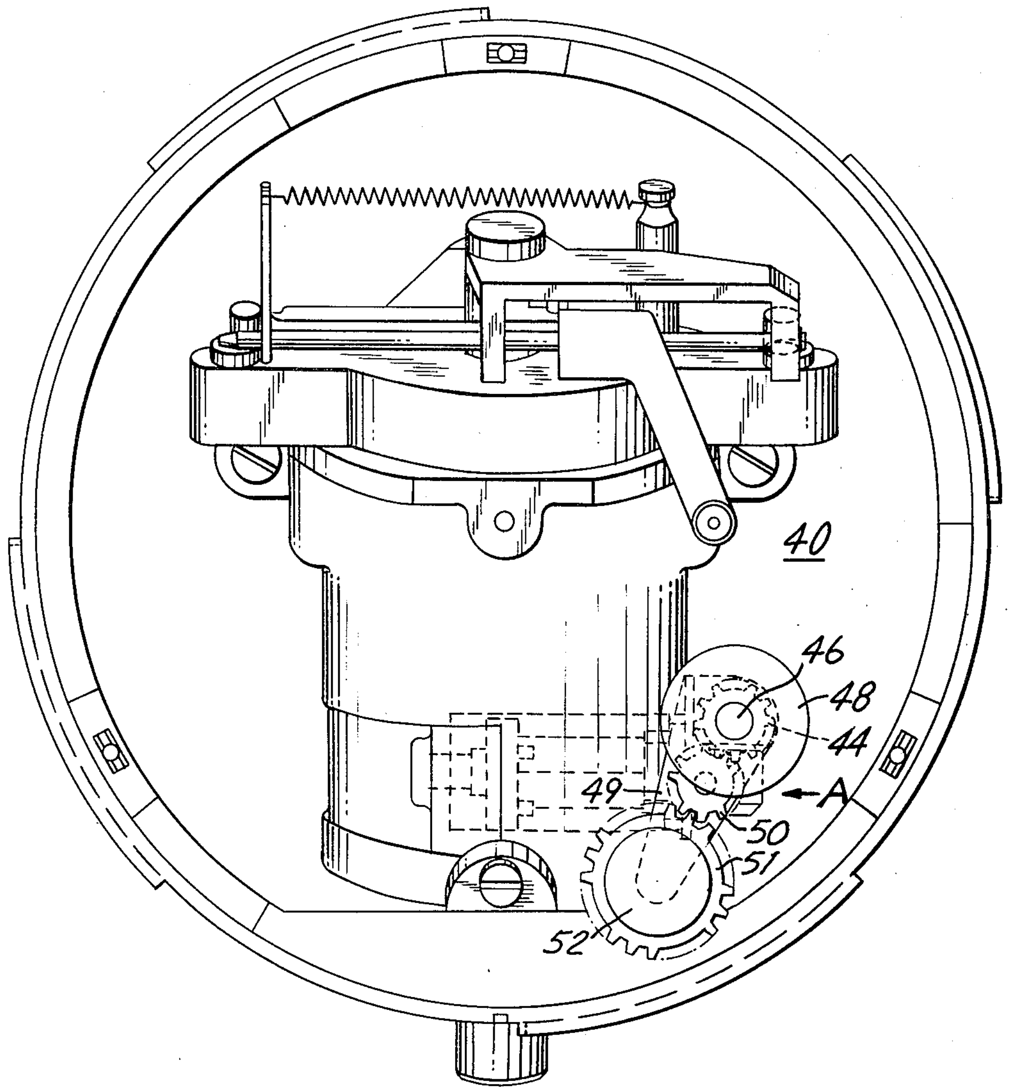
FIG. 3 is a top view of the device shown in FIG. 2 (with cover 56 and disc 54 removed)
Figure 4:
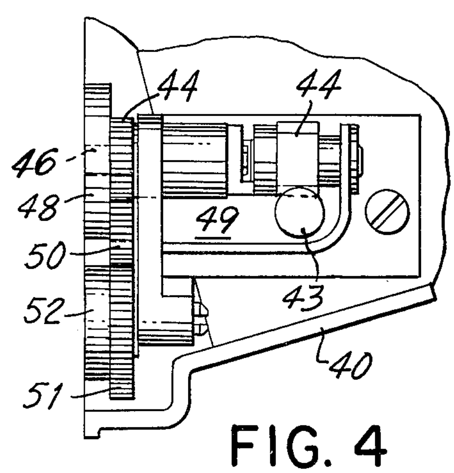
FIG. 4 is a partially sectional view taken along direction A of FIG. 3.

In a preferred embodiment (FIGS. 2, 3 and 4), the speed measuring device is a normal eddy-current measuring system which is driven in known manner by a flexible shaft (not shown). Coupled in a suitable manner to the flexible drive shaft, there is provided a shaft 29 which carries the permanent magnet 30 of the eddy-current system. At the measuring shaft 31, one end of which is mounted in the shaft 29 in known manner, a drum 32 is mounted loosely surrounding the magnet 30, which drum has magnetic return ring 33 as well as temperature compensation ring 34 fastened thereto. The eddy-current system also comprises a spiral spring 35 which supplies the counter force counteracting the measuring force. The internal end of the spring is also fastened to the measuring shaft 31. The measuring shaft 31 bears a toothed wheel (not shown). This toothed wheel cooperates (in a manner not shown) with the recording means, for instance, with a slide part at which the recording pencil proper is fastened so that it is movable transverse to the transport direction of the record carrier 36.

The shaft 29 is provided with a worm 41 and is mounted by means of bushings 38, 39 in a measuring housing 37 which in itself is insertable into the housing 40 of a recording device. A flange 57 at the measuring housing 37 serves to fasten the guide hose of the flexible shaft. The worm 41 is in engagement with a worm wheel 42 at the shaft of which another worm 43 is arranged, which shaft is mounted in a suitable bearing part 49.

By means of a worm wheel 44, which is in engagement with the worm 43, a shaft 46 is driven via a ratchet mechanism 45. A toothed wheel 47 drives a multipole magnet 48 being magnetized at its circumference and in the form of a disc connected thereto and mounted also in the bearing part 49. The toothed wheel 47 via an intermediate gear 50 is in engagement with another toothed wheel 51 arranged on the same axis as a toothed wheel 52. This latter wheel engages the internal toothing 53 of a transparent disc 54 rotatably mounted on a shaft 55 preferably bearing a suitable scaling and serving as a bearing or support part for the record carrier 36 connected in suitable manner to the disc 54. A lid 56 which is also made from a transparent material closes the recording device at its front side.

As compared with the known erasing devices which are at most usable for laboratory instruments, the device according to the invention described above is advantageous insofar as it can be realized with a minimum of space and parts requiring absolutely no servicing. It is another advantage that commercially available permanent magnets may be used so that a high reliability of operation is guaranteed under the operating conditions in a motor vehicle since the drive driving the recording means in dependence on the measured value also serves to operate the erasing device so that no auxiliary force is required for its function. This means that the solution according to the invention is especially useful in a recording device which is to be used in a motor vehicle.

The recognition that an easily discernible recording is also to be achieved when the erasing state of the record carrier is optically between the extreme positions "light" and "dark", which may therefore be termed "gray", and especially when a recording device in accordance with DE-OS No. 25 20 581 is used which provides an absolutely dark trace surrounded by two light seams on both sides, finally results in a rotating, disc-shaped permanent magnet as most advantageous with respect to the cost for drive and parts.

While the foregoing description and drawings represent the preferred embodiments of the present invention, it will be obvious to those skilled in the art that various changes and modifications may be made therein without departing from the true spirit and scope of the present invention.

What is claimed is:

1. In combination with a record carrier modifiable by magnetic fields wherein a magnetic recording means allows visually readable recordings of measured values and wherein drive means are used to drive a measuring device associated with said record carrier, an erasing device comprising at least one erasing magnet positioned directly on top of the record carrier and movable transverse to the transport direction of said record carrier so that the magnetic axis of said magnet is parallel to the plane of the record carrier, the movement of the erasing magnet being effective essentially in the direction of the magnetic axis wherein a permanent magnet is used as the erasing magnet; and a carrier for the erasing magnet, said carrier being in driving connection with the driving means of the measuring device.

2. An erasing device according to claim 1, including means for providing an oscillatory motion to said magnet carrier.

3. An erasing device according to claim 1, wherein the carrier of the erasing magnet is itself rotatably mounted.

4. An erasing device according to claims 1 or 3, wherein as an erasing magnet a rotatably mounted, disc-shaped magnetic body of permanent magnet material is used at the circumference of which at least one pair of poles is provided, the magnetic body being in driving connection with the record carrier.

* * * * *